United States Patent
Dow et al.

(10) Patent No.: US 9,946,564 B2
(45) Date of Patent: Apr. 17, 2018

(54) ADJUSTING VIRTUAL MACHINE MIGRATION PLANS BASED ON ALERT CONDITIONS RELATED TO FUTURE MIGRATIONS

(71) Applicant: INTERNATIONAL BUSINESS MACHINES CORPORATION, Armonk, NY (US)

(72) Inventors: Eli M. Dow, Poughkeepsie, NY (US); James P. Gilchrist, Poughkeepsie, NY (US); Steven K. Schmidt, Essex Junction, VT (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 14/747,278

(22) Filed: Jun. 23, 2015

(65) Prior Publication Data

US 2016/0378520 A1 Dec. 29, 2016

(51) Int. Cl.
- G06F 9/455 (2006.01)
- H04L 12/24 (2006.01)
- G06F 3/0484 (2013.01)

(52) U.S. Cl.
CPC ...... *G06F 9/45558* (2013.01); *G06F 9/45533* (2013.01); *G06F 3/04847* (2013.01); *G06F 2009/4557* (2013.01); *H04L 41/0856* (2013.01)

(58) Field of Classification Search
CPC ............... G06F 11/3433; G06F 11/008; G06F 9/45558; H04L 41/12
See application file for complete search history.

(56) References Cited

U.S. PATENT DOCUMENTS

| | | |
|---|---|---|
| 7,730,486 B2 | 6/2010 | Herington |
| 8,185,894 B1 | 5/2012 | Watson et al. |

(Continued)

OTHER PUBLICATIONS

Choi, Hyung Won, et al. "Autonomous Learning for Efficient Resource Utilization of Dynamic VM Migration", Jun. 7, 2008, Proceedings of the 22nd annual international conference on Supercomputing, ACM.*

(Continued)

*Primary Examiner* — Lewis A Bullock, Jr.
*Assistant Examiner* — Gilles Kepnang
(74) *Attorney, Agent, or Firm* — Steven Chiu, Esq.; Blanche E. Schiller, Esq.; Heslin Rothenberg Farley & Mesiti P.C.

(57) ABSTRACT

Migration of virtual machines within a computing environment is facilitated. A processor obtains a current virtual machine to host mapping in the computing environment, as well as a plurality of future virtual machine to host mappings. A current migration plan to migrate from a current state of the computing environment to another state of the computing environment is also obtained. Based on the current virtual machine to host mapping and one or more future virtual machine to host mappings of the plurality of future virtual machine to host mappings a determination is made that one or more potential alert conditions exist in the current migration plan. The current migration plan and/or one or more future virtual machine to host mappings are displayed. The current migration plan is adjusted to address at least one potential alert condition of the one or more potential alert conditions to improve processing within the computing environment.

20 Claims, 12 Drawing Sheets

(56) References Cited

U.S. PATENT DOCUMENTS

| | | | |
|---|---|---|---|
| 8,191,063 B2 | 5/2012 | Shingai et al. | |
| 8,245,140 B2 | 8/2012 | Barber et al. | |
| 8,291,411 B2 | 10/2012 | Beaty et al. | |
| 8,327,355 B2 | 12/2012 | Dow et al. | |
| 8,370,473 B2 | 2/2013 | Gilkson | |
| 8,370,560 B2 | 2/2013 | Dow et al. | |
| 8,635,396 B2 | 1/2014 | Dow et al. | |
| 8,661,211 B2 | 2/2014 | Dow | |
| 8,671,256 B2 | 3/2014 | Dow | |
| 8,694,990 B2 | 4/2014 | Dow et al. | |
| 8,843,924 B2 | 9/2014 | Dow et al. | |
| 8,880,908 B2 | 11/2014 | Brenneman et al. | |
| 8,949,428 B2 | 2/2015 | Dow et al. | |
| 8,966,084 B2 | 2/2015 | Dow et al. | |
| 9,052,938 B1* | 6/2015 | Bhide | G06F 9/45533 |
| 9,223,604 B2* | 12/2015 | Ichikawa | G06F 9/5077 |
| 9,612,767 B2* | 4/2017 | Huang | G06F 3/0647 |
| 2007/0204266 A1 | 8/2007 | Beaty et al. | |
| 2007/0283347 A1* | 12/2007 | Bobroff | G06F 8/63 718/1 |
| 2009/0070771 A1* | 3/2009 | Yuyitung | G06Q 10/06 718/105 |
| 2009/0300173 A1* | 12/2009 | Bakman | G06F 11/008 709/224 |
| 2009/0307597 A1 | 12/2009 | Bakman | |
| 2010/0100879 A1* | 4/2010 | Katiyar | G06F 8/20 718/1 |
| 2011/0161491 A1* | 6/2011 | Sekiguchi | G06F 9/4856 709/224 |
| 2011/0161851 A1* | 6/2011 | Barber | G06F 9/4856 715/769 |
| 2011/0231680 A1* | 9/2011 | Padmanabhan | G06F 1/3209 713/310 |
| 2011/0302578 A1 | 12/2011 | Isci et al. | |
| 2012/0030669 A1 | 2/2012 | Tsirkin | |
| 2012/0117565 A1* | 5/2012 | Staelin | G06F 9/5072 718/1 |
| 2012/0034112 A1 | 9/2012 | Shiffhauer et al. | |
| 2012/0246638 A1 | 9/2012 | He et al. | |
| 2012/0297238 A1* | 11/2012 | Watson | G06F 9/5088 714/4.11 |
| 2012/0297307 A1* | 11/2012 | Rider | G06F 11/3433 715/736 |
| 2012/0324073 A1 | 12/2012 | Dow et al. | |
| 2012/0324445 A1 | 12/2012 | Dow et al. | |
| 2013/0003531 A1 | 1/2013 | Dow et al. | |
| 2013/0339956 A1* | 12/2013 | Murase | G06F 9/505 718/1 |
| 2013/0346619 A1* | 12/2013 | Panuganty | H04L 41/12 709/226 |
| 2014/0019974 A1 | 1/2014 | Siu | |
| 2014/0156958 A1 | 6/2014 | Dow et al. | |
| 2014/0156962 A1 | 6/2014 | Dow et al. | |
| 2014/0157258 A1 | 6/2014 | Dow et al. | |
| 2014/0173593 A1 | 6/2014 | Padala | |
| 2014/0208329 A1* | 7/2014 | Abali | G06F 9/45533 718/104 |
| 2014/0215073 A1 | 7/2014 | Dow et al. | |
| 2014/0380314 A1* | 12/2014 | Shimada | G06F 9/4856 718/1 |
| 2015/0007178 A1 | 1/2015 | Keneko | |
| 2016/0239322 A1* | 8/2016 | Watanabe | G06F 9/45558 |
| 2017/0024260 A1* | 1/2017 | Chandrasekaran | G06F 9/45558 |
| 2017/0060627 A1* | 3/2017 | Birkestrand | G06F 9/4856 |

OTHER PUBLICATIONS

Choi, Hyung Won, et al. "Autonomous learning for efficient resource utilization of dynamic vm migration." 2008. Proceedings of the 22nd annual international conference on Supercomputing. ACM.*

Mell, Peter and Tim Grance, "The NIST Definition of Cloud Computing," National Institute of Standards and Technology, Information Technology Laboratory, Special Publication 800-145, Sep. 2011, pp. 1-7.

IBM, "Temporal and Multi-dimensional Visualization of Performance Data in Virtualized Server Environments," IPCOM000185422D, Jul. 24, 2009, pp. 1-4.

Dow, Eli, et al., "Machine Learning for Virtual Machine Migration Plan Generation," U.S. Appl. No. 14/694,011, filed Apr. 23, 2015, pp. 1-41.

Dow et al., "Adjusting Virtual Machine Migration Plans Based on Alert Conditions Related to Future Migrations," U.S. Appl. No. 14/869,769, filed Sep. 29, 2015, pp. 1-41.

List of IBM Patents or Patent Applications Treated as Related, Mar. 16, 2016, 2 pages.

Office Action for U.S. Appl. No. 14/869,769 dated Dec. 5, 2016, pp. 1-20.

Office Action for U.S. Appl. No. 14/869,769 dated Jul. 26, 2017, pp. 1-22.

Final Office Action for U.S. Appl. No. 14/869,769 dated Mar. 27, 2017, pp. 1-20.

Lester, Patrick, "A* Pathfinding for Beginners," GameDev.net, Oct. 2003, pp. 1-15.

* cited by examiner

ADJUSTING VIRTUAL MACHINE MIGRATION PLANS BASED ON ALERT CONDITIONS RELATED TO FUTURE MIGRATIONS

BACKGROUND

One or more aspects relate, in general, to processing within a computing environment, and in particular, to facilitating virtual machine migration within the computing environment.

In current virtual environments, virtual machines, which are non-hardware implementations (e.g., software implementations) of physical machines, are hosted by physical machines, referred to as hosts. Each virtual machine is mapped to a particular physical machine, and a physical machine may host one or more virtual machines. The mapping of virtual machines to physical machines may be changed to address certain needs, such as load balancing or physical or virtual machine consolidation.

SUMMARY

Shortcomings of the prior art are overcome and additional advantages are provided through the provision of a computer program product for facilitating migration of virtual machines within a computing environment. The computer program product comprises a storage medium readable by a processing circuit and storing instructions for execution by the processing circuit for performing a method. The method includes, for instance, obtaining, by a processor, a current virtual machine to host mapping in the computing environment; obtaining, by the processor, a plurality of future virtual machine to host mappings; obtaining, by the processor, a current migration plan to migrate from a current state of the computing environment to another state of the computing environment; determining, based on the current virtual machine to host mapping and one or more future virtual machine to host mappings of the plurality of future virtual machine to host mappings, that one or more potential alert conditions exist in the current migration plan; displaying at least one of the current migration plan and one or more future virtual machine to host mappings; and adjusting the current migration plan to address at least one potential alert condition of the one or more potential alert conditions to improve processing within the computing environment.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
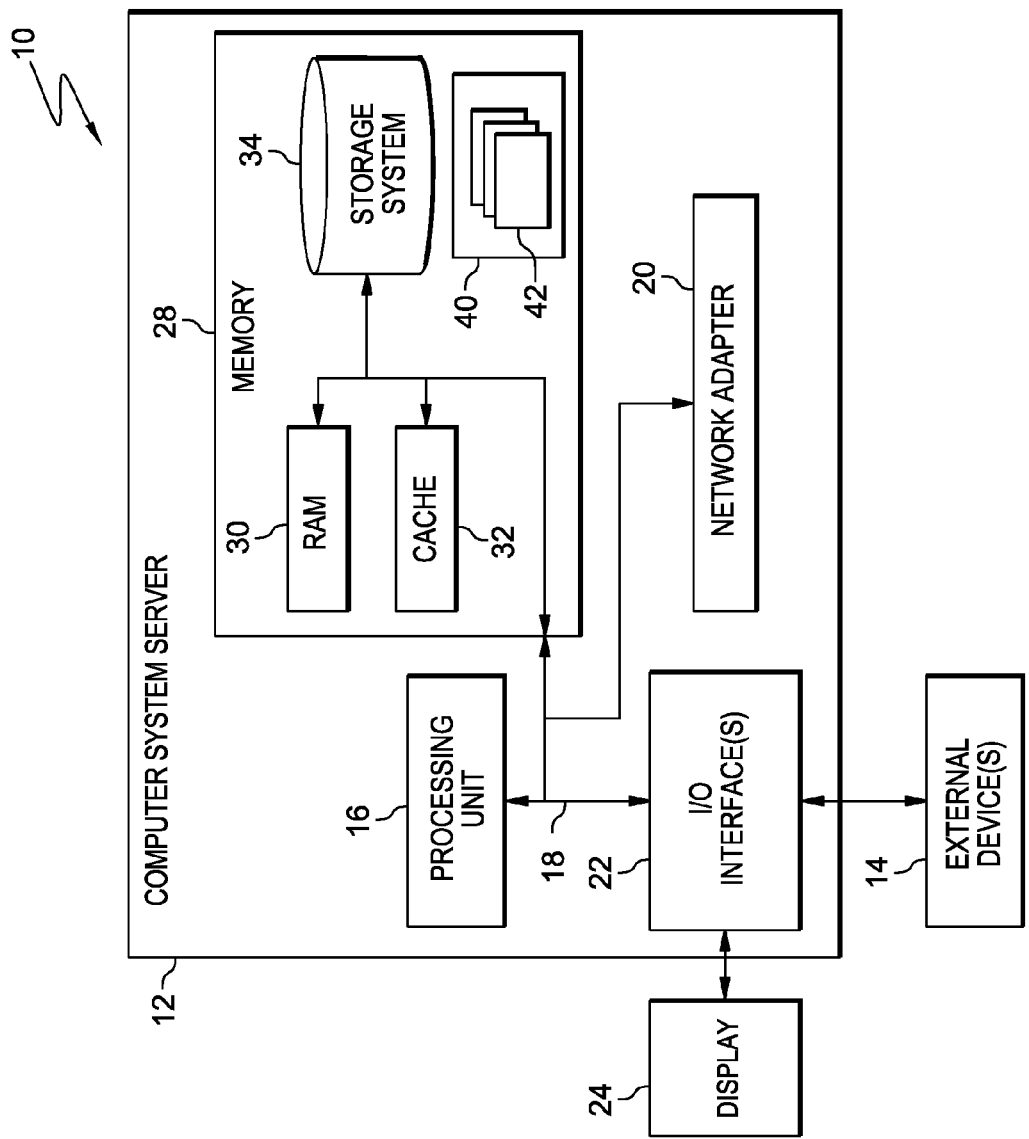
FIG. 1 depicts one embodiment of a cloud computing node.

In accordance with one or more aspects, a capability is provided to facilitate migration of virtual machines within a computing environment. The capability includes, for instance, obtaining a plan to migrate one or more virtual machines from one or more hosts to one or more other hosts. Additionally, a plurality of future mappings of virtual machines to hosts are obtained. The future mappings are for different points of time in the future (e.g., 1 hour, 10 hours, 50 hours, etc.), and those points in time may be selected automatically by a processor or based on user input. In one example a user slides a bar on a graphical user interface (GUI) to indicate the points in time for which future mappings are to be obtained.

Based on at least one or more of the future mappings, a determination is made as to whether one or more alert conditions within the computing environment exists, such as cycles, loops, a ping-pong effect, a user-defined condition indicating a desired change based on a current migration plan/schedule, etc. If an alert condition exists, the current migration plan may be adjusted in order to improve processing within the computing environment, such as improving load balancing, power management, consolidation, etc.

Load balancing strives to amortize demand for compute resources across the hardware capabilities such that contention is minimized in aggregate (increasing response times for individual workloads due to relaxed contention on physical resources). Load balancing may correlate to many aspects, including but not limited to, CPU usage, energy savings, etc. For instance, if a certain machine hosting virtual machines is overloaded and constantly running at 100% CPU, that machine may not be selected to merge, and perhaps one or more of the virtual machines may be migrated off that machine. Further, consolidation requires fewer hosts to be powered on or placed in high energy consumption states relative to their minimum power savings mode (saving energy and thus, cost of operation).

Such a capability is usable in many types of computing environments, including but not limited to, cloud computing environments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
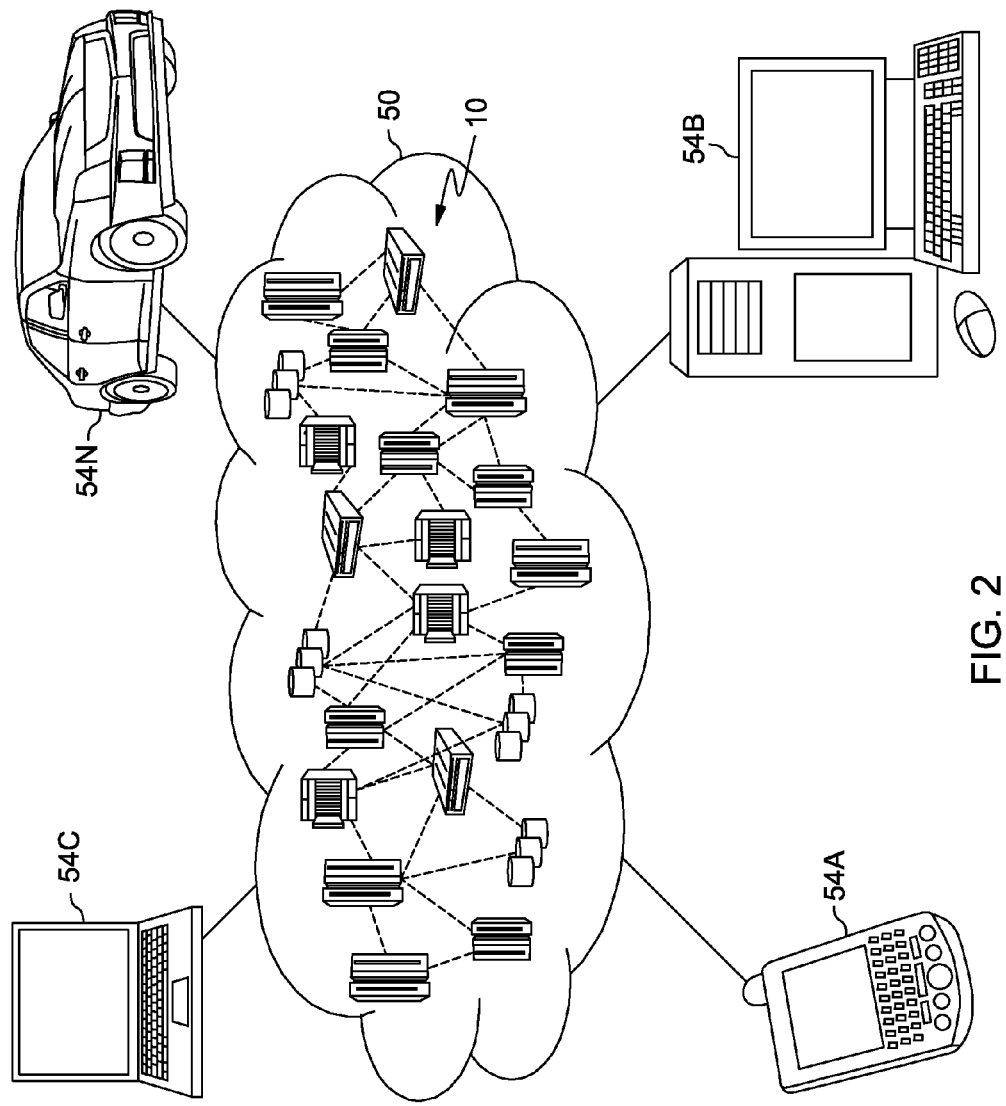
FIG. 2 depicts one embodiment of a cloud computing environment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
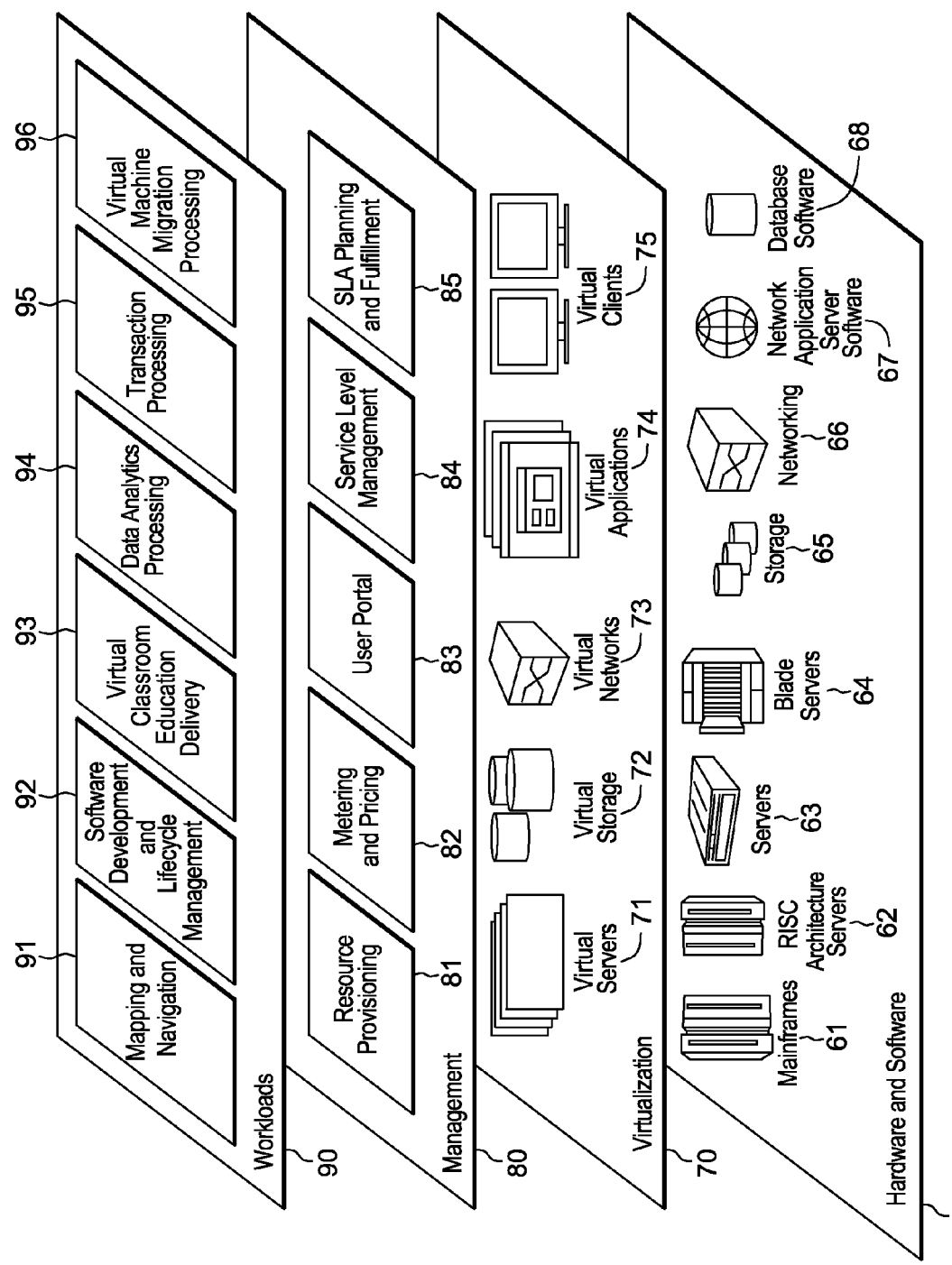
FIG. 3 depicts one example of abstraction model layers.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual machine migration processing 96.

Figure 4:
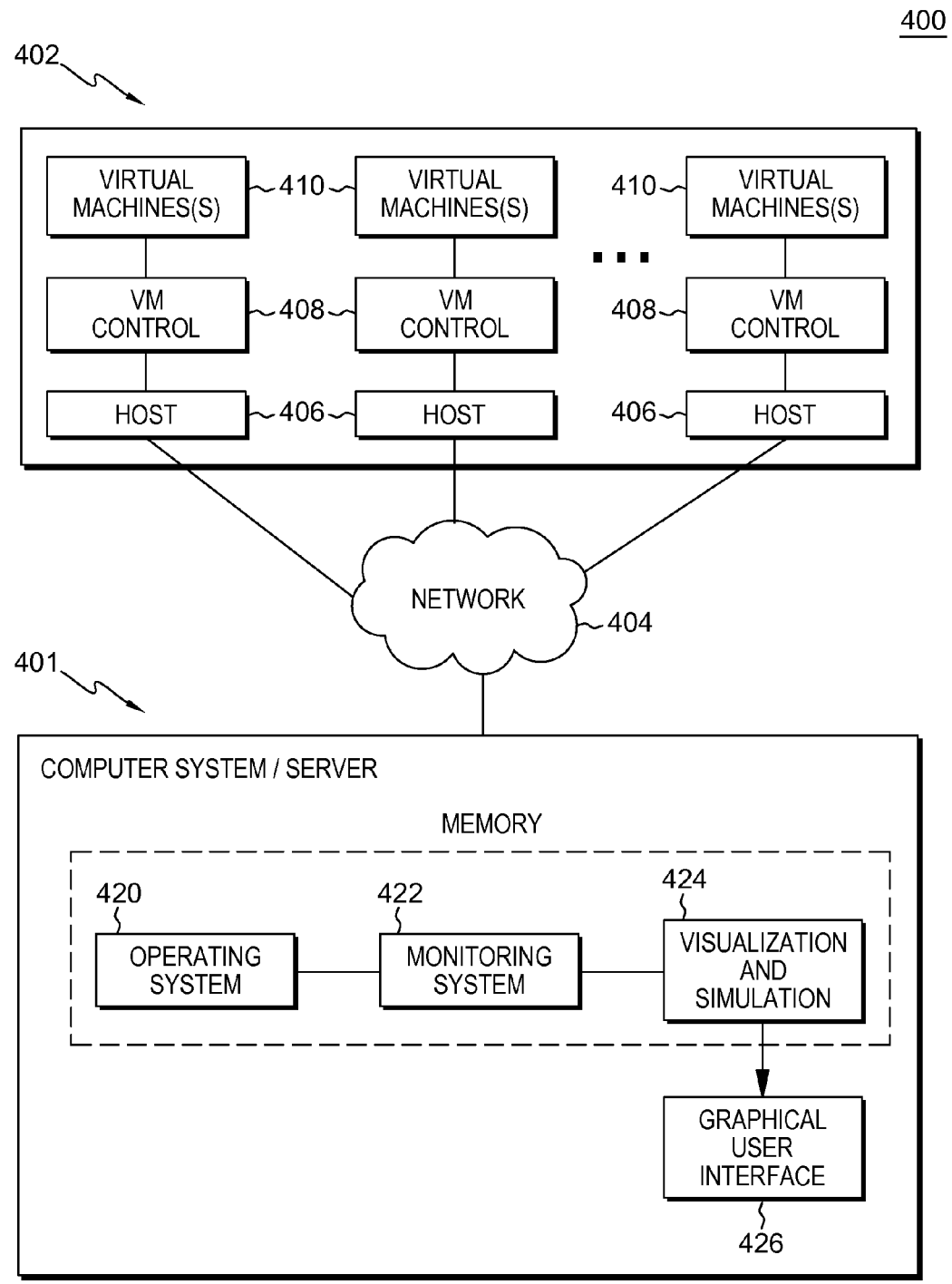
FIG. 4 depicts one example of a computing environment to incorporate and use one or more aspects.

In one example, the computer system/server of FIG. 1 may be included in a computing environment to be used to display a graphical user interface to be used in facilitating migration of virtual machines to hosts, in accordance with one or more aspects. One example of such a computing environment is depicted in FIG. 4. Referring to FIG. 4, in one embodiment, a computing environment 400 includes a computer system/server 401, such as the one depicted and described with reference to FIG. 1, communicatively connected to a virtualized data center 402 via a network 404. Virtualized data center 402 may include, for instance, a plurality of hosts 406, each of which is a physical machine executing a virtual machine control 408 that controls one or more virtual machines 410 accessing resources of its host, including fixed storage, communications channels, memory and processor utilization, as examples.

To facilitate management and migration of the virtual machines between hosts, computer system/server 401 includes at least one operating system 420 executing a monitoring system 422, which is coupled to a visualization and simulation module 424 that includes program code to render a graphical user interface (GUI) 426. Operating system 420, monitoring system 422, and visualization and simulation module 424 are included within the memory of computer system/server 401. Further, the operating system is executed by one or more of the processors of computer system/server 401.

Monitoring system 422 may be executed to obtain certain metrics regarding the virtualized data center, including, for instance, CPU utilization of the hosts attributed to the respective virtual machines, power consumption of the hosts, and the load of the hosts, as examples. The metrics may be rendered in graphical user interface 426 via program code of visualization and simulation module 424. As examples, the program code may render a scatter plot in the GUI depicting the load metrics, may compute predictive metrics and display predictive mappings of virtual machines to hosts, etc.

Figure 5A:
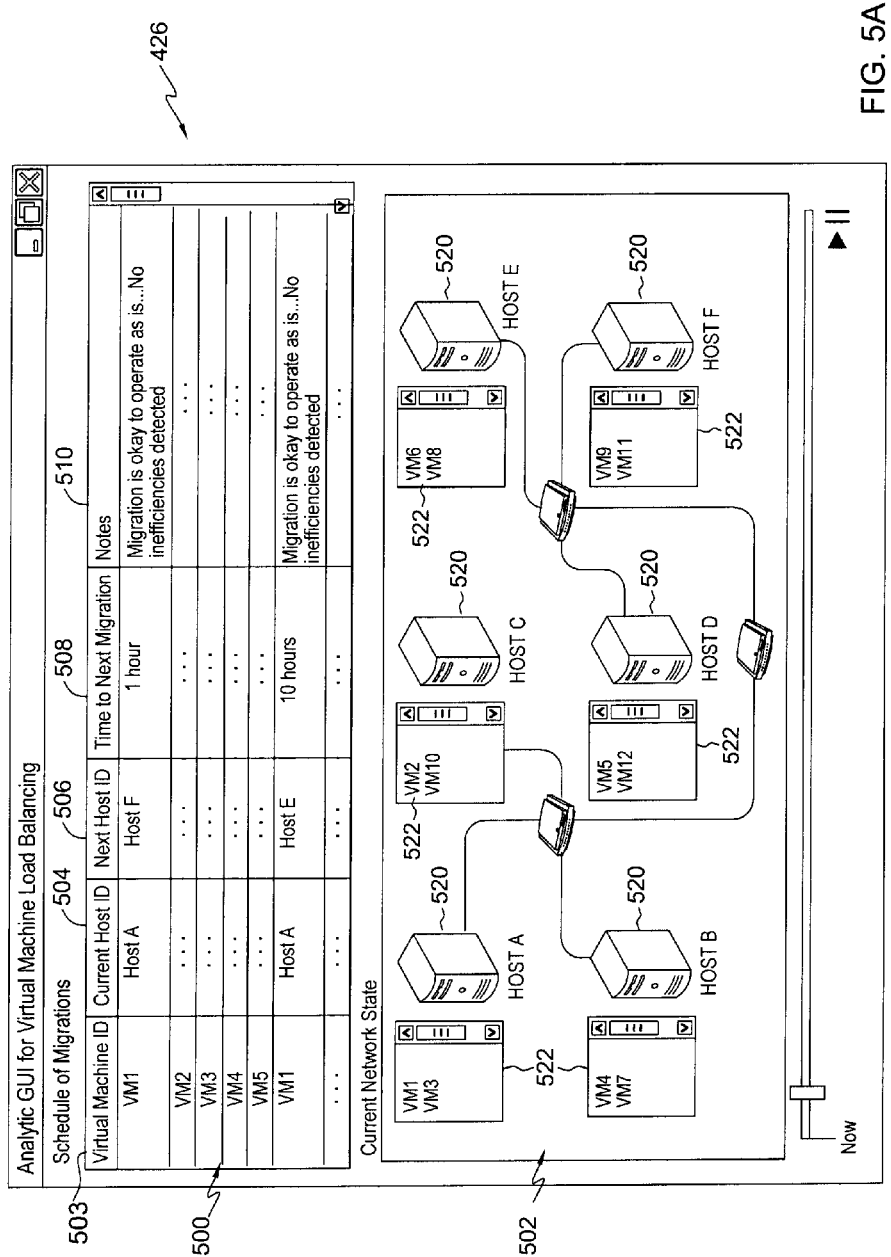
FIG. 5A depicts one example of an analytic graphical user interface depicting one example of a schedule to migrate virtual machines to hosts, and a pictorial representation of a current network state of virtual machines to hosts.

One example of graphical user interface 426 is depicted in FIG. 5A. As shown in this example, graphical user interface 426 visually depicts a data structure 500 and a current network state 502. Data structure 500 includes, for instance, a table having a plurality of columns, including a virtual machine id column 503, a current host identifier column 504, a next host identifier column 506, a time to migrate column 508, and a notes column 510. This table illustrates a schedule of migrations, also referred to herein as a current migration plan. For instance, it is shown that virtual machine VM1 that is currently on Host A is scheduled to be moved to Host F in one hour. The notes indicate that this migration does not include any alert conditions. Similarly, it is shown that VM1 currently hosted by Host A is scheduled to be moved to Host E in 10 hours, and this migration also does not include an alert condition, in this example. Other schedules may also be included. VM1 is only one example.

As indicated, graphical user interface 426 also pictorially depicts a current network state that shows a plurality of hosts 520 and the virtual machines 522 currently hosted by those hosts. For instance, Host A is depicted as hosting VM1 and VM3; Host B is depicted as hosting VM4 and VM7; Host C is depicted as hosting VM2 and VM10; etc. Although Hosts A-F are depicted, it is understood that more, less or different hosts with their respective virtual machines may be depicted. Hosts A-F are only examples depicted herein.

Figure 5B:
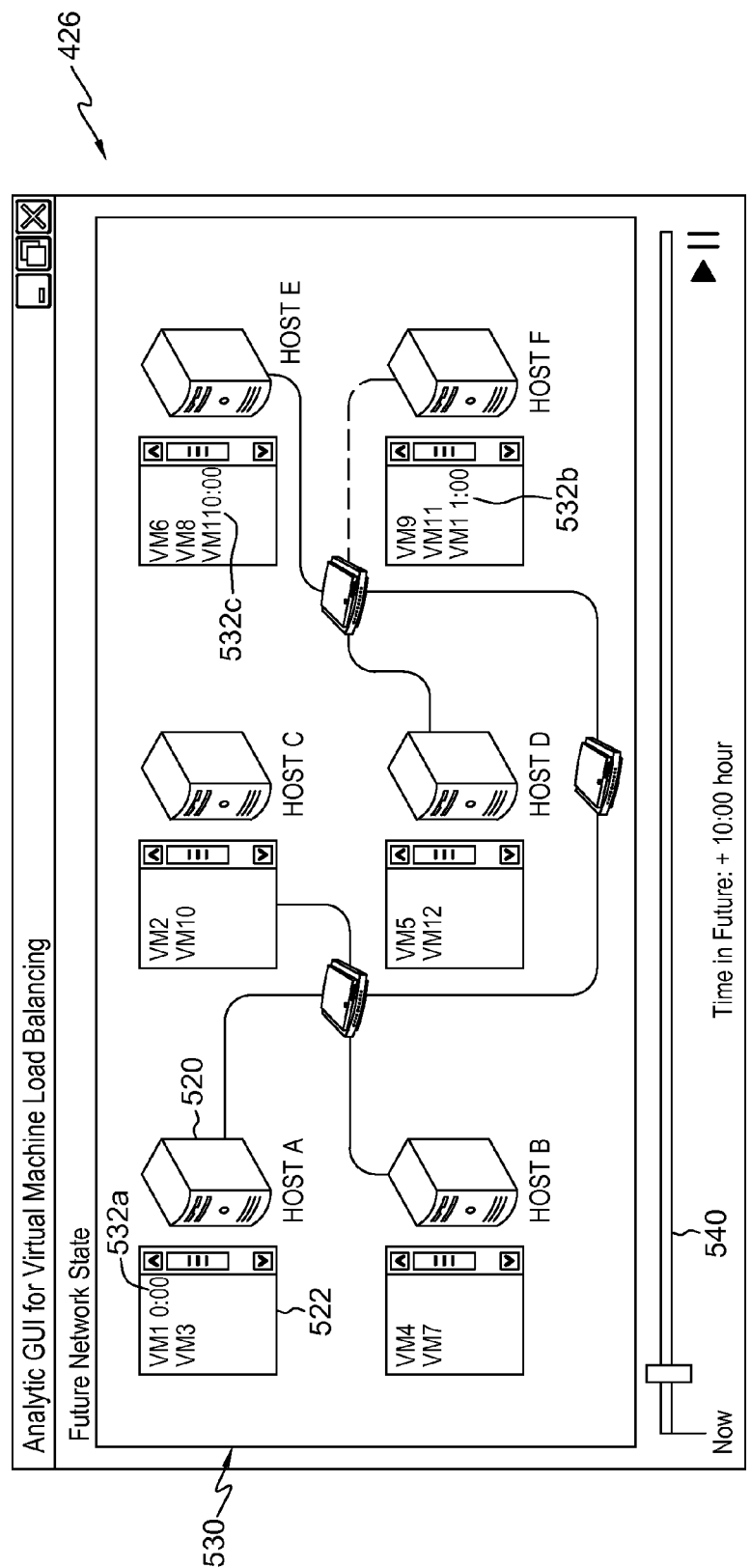
FIG. 5B depicts one example of an analytic graphical user interface depicting one example of a future network state of virtual machines to hosts.

Graphical user interface 426 may also include a future network state 530, as shown in FIG. 5B. This may be shown on the same window as table 500 and current network state 502 or a separate window, as examples. Future network state 530 pictorially depicts hosts 520 and virtual machines 522 associated with the respective hosts. However, in the future network state 530, a time 532 may be indicated next to a virtual machine pictorially depicting the scheduled time to migrate. For instance, as shown at 532a, VM1 is currently hosted by Host A as indicated by the time 0:00, but it is to be migrated to Host F in one hour, as indicated by the time at 532b, and to Host E in ten hours, as indicated by the time at 532c. Again, other examples may be depicted.

Graphical user interface 426 also includes a time scroll bar 540 that a user may use to slide to show future network states in time. In this example, the bar is slid to show the future network state for the next ten hours (see, e.g., 532c), but as shown the bar may be slid to show additional hours.

Figure 5C:
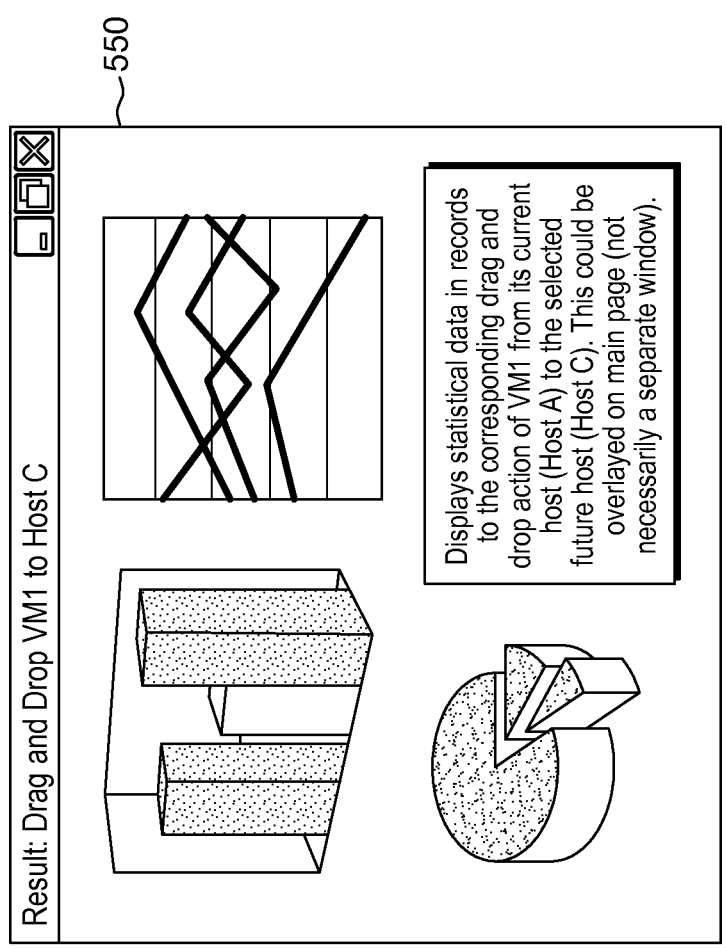
FIG. 5C depicts one example of dragging and dropping a selected virtual machine to a chosen host, in accordance with one or more aspects.

In a further embodiment, graphical user interface 426 may also include a graphical representation 550, as shown in FIG. 5C. In this example, graphical representation 550 includes a result of a drag and drop by the user from VM1 to Host C, in which statistical data is displayed in regards to the corresponding drag and drop action. This graphical representation may be overlaid on the main page or as a separate window, as examples.

Figure 6A:
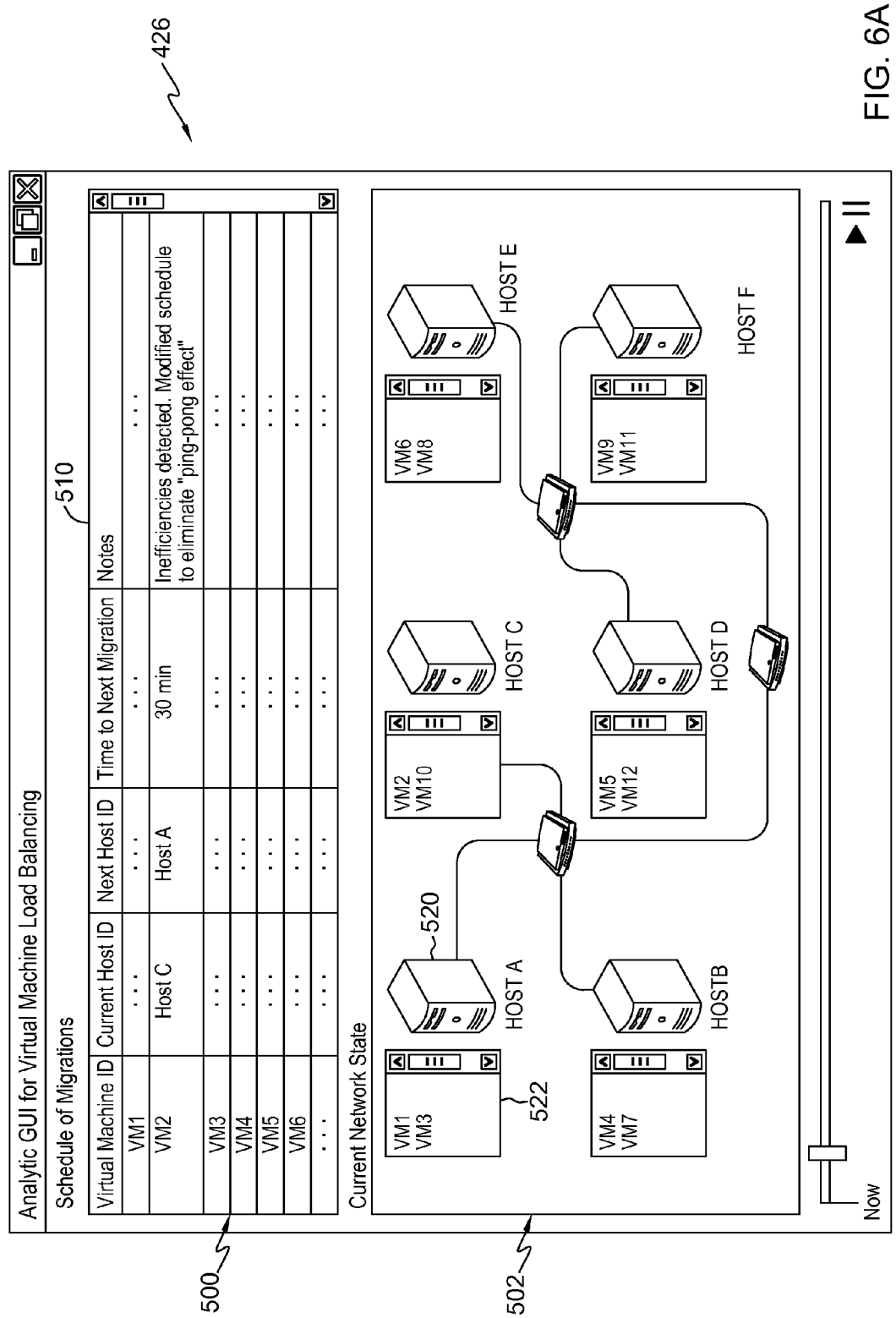
FIG. 6A depicts one example of an analytic graphical user interface depicting another example of a schedule to migrate virtual machines to hosts, and a pictorial representation of a current network state of virtual machines to hosts.
Figure 6B:
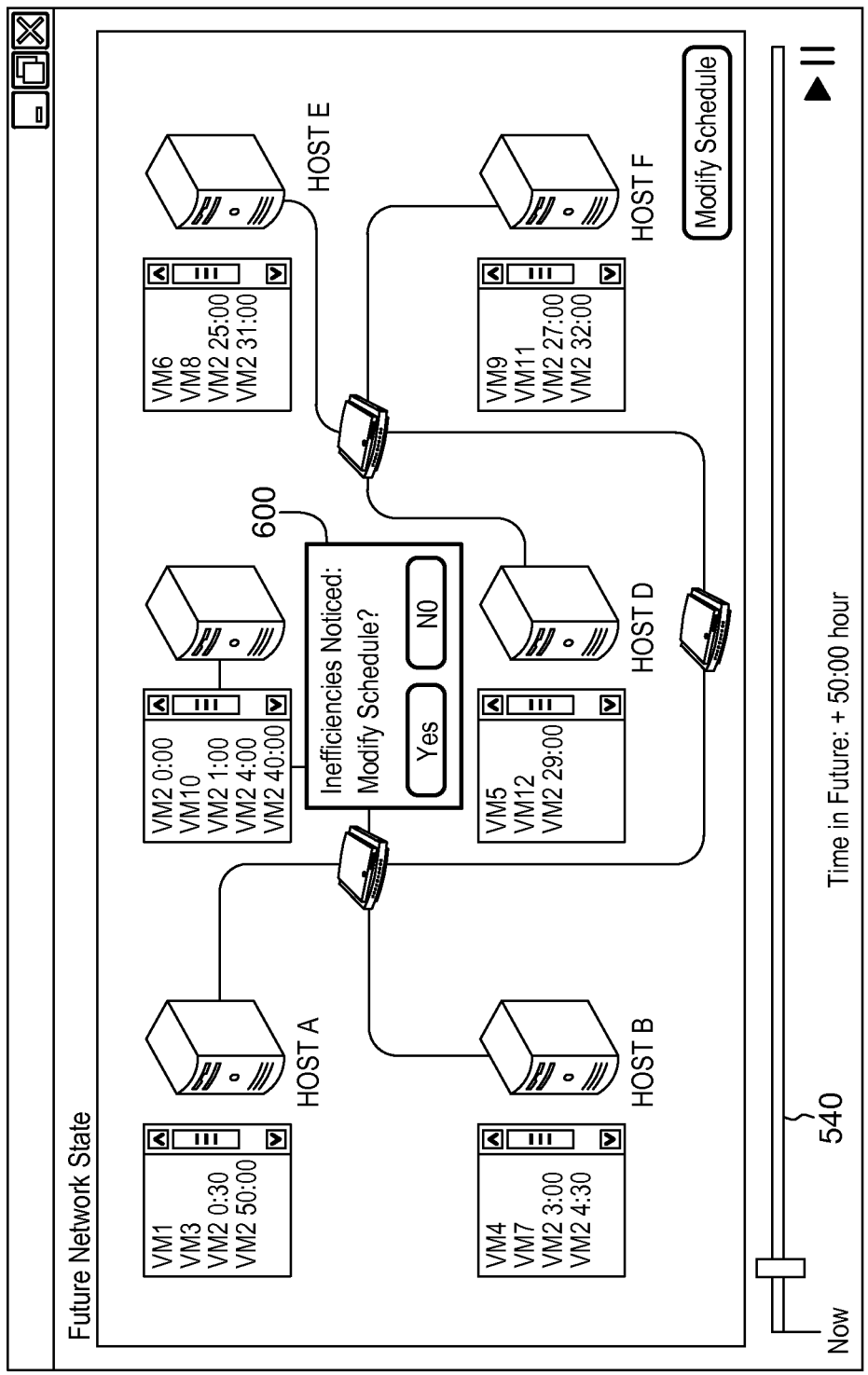
FIG. 6B depicts one example of an analytic graphical user interface depicting another example of a future network state of virtual machines to hosts.
Figure 6C:
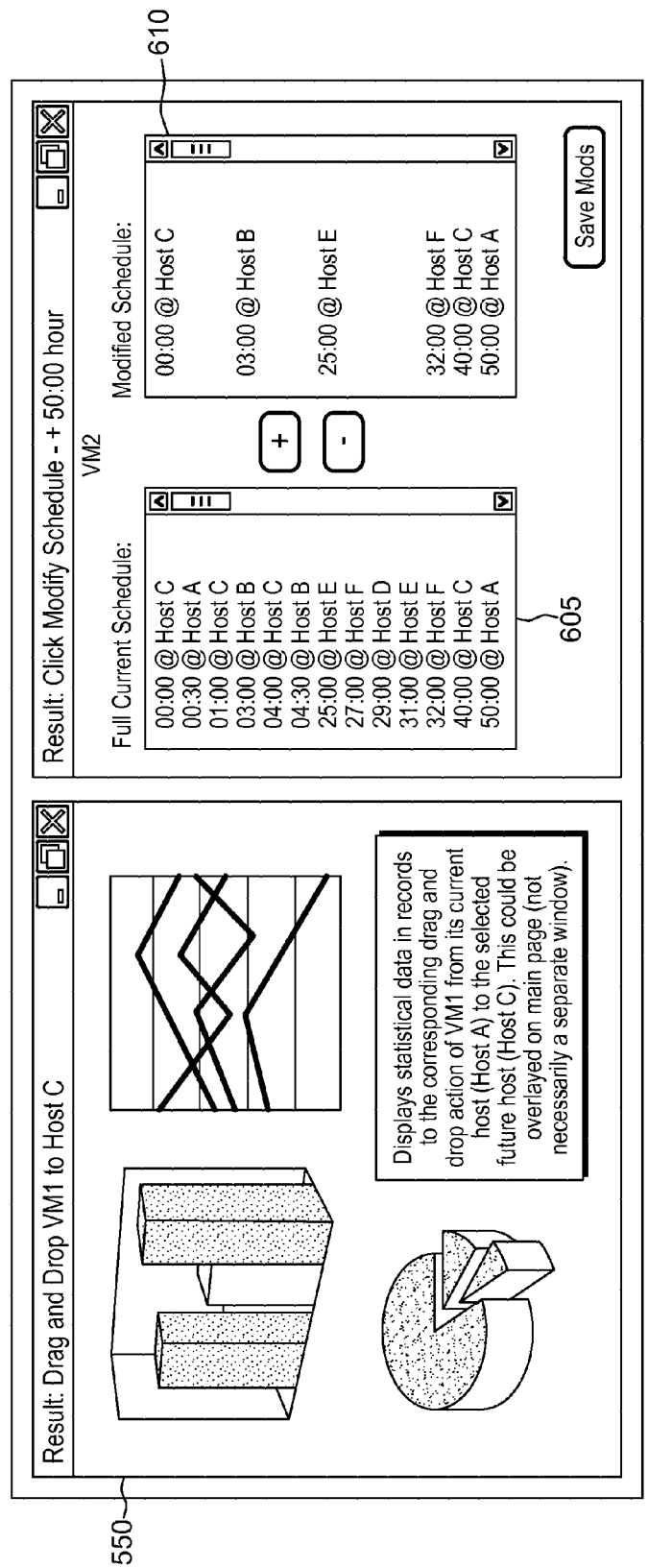
FIG. 6C depicts one example of dragging and dropping a selected virtual machine to a chosen host and a result of a modified migration schedule, in accordance with one or more aspects.

Another example of graphical user interface 426 is depicted in FIGS. 6A-6C. In this example, alert conditions are shown. For instance, in FIG. 6A, table 500 shows VM2 is currently on Host C and is to be moved to Host A in 30 minutes, which is indicated in notes 510 as an alert condition. For instance, the alert condition indicates an inefficiency, which is due to a ping-pong effect, which means the virtual machine is scheduled to move back and forth between hosts in a predefined amount of time. As an example, VM2 is on Host C; in 30 min., it is scheduled to be moved to Host A; in 1 hr, it is scheduled to be back on Host C. Thus, a ping-pong effect. An indication of this alert condition is indicated on the graphical user interface, as depicted in FIG. 6B at 600. Further, in this example, scroll bar 540 is slid to show fifty hours of future migrations.

Based on the alert condition, the current migration plan that includes, e.g., move VM2 to Host A in 30 minutes, as well as other migrations, as depicted in FIG. 6C at 605 is modified, providing a revised migration plan which is depicted at 610. This modified schedule indicates VM2 is currently on Host C and will not be migrated for 3 hours and then to Host B. The migrations to Host A at 00:30 and Host C at 01:00 are avoided, thereby improving performance.

Figure 7A:
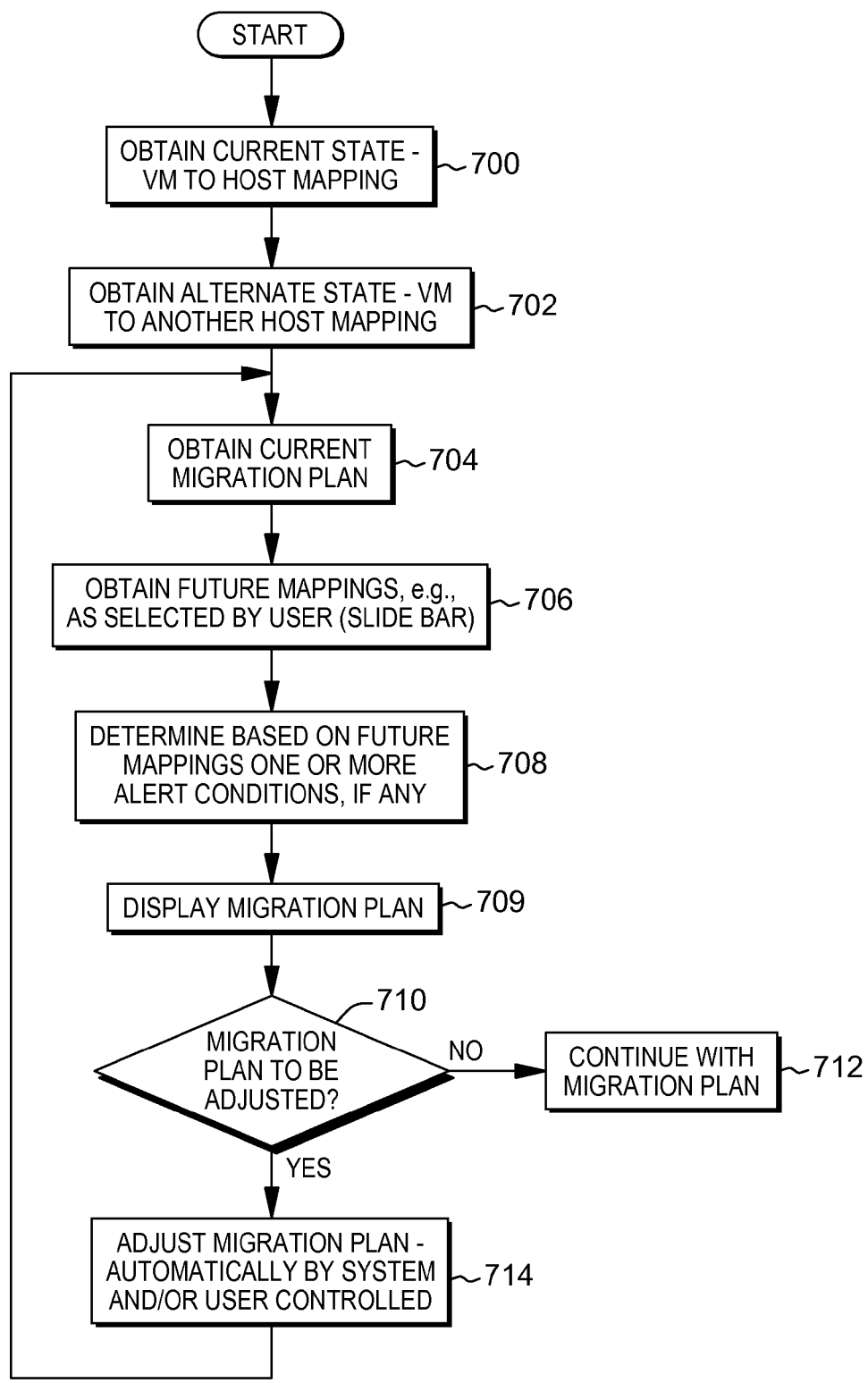
FIG. 7A depicts one embodiment of logic to determine a migration plan, and to display current and future mappings, as well as potential alert conditions, in accordance with one or more aspects.

One embodiment of logic to facilitate migration of virtual machines using a graphical user interface is described with reference to FIG. 7A. Referring to FIG. 7A, initially, a processor of the computer system/server obtains a current state of virtual machine to host mapping, STEP 700. This current state may be for a selected one or more virtual machines and/or hosts of the computing environment or for all virtual machines and hosts of the computing environment.

Further, the processor obtains (e.g., computes or is provided, as examples) an alternate state of virtual machine to host mapping, STEP 702. Again, this alternate state may be for a selected one or more virtual machines and/or hosts or for all virtual machines and hosts of the computing environment. As examples, the alternate virtual machine to host mapping may be computed a number of ways, depending on, for instance, a strategy for the computing environment. For instance, if the strategy is load balancing, then a round-robin technique for load balancing may be used; and if the strategy is consolidation, e.g., of hosts, or virtual machines, then a genetic or combinatorial bin packing algorithm for consolidation may be used. Other examples are also possible for the strategy and/or mapping technique. The input to the algorithms may include virtual machine and host capacitance (e.g., RAM, CPU, network bandwidth, I/O bandwidth); any type of constraints, such as co-location (may be located with other particular virtual machines) or anti-co-location (cannot be on a particular host or with a particular virtual machine); or time duration (is to be on a particular host for a selected amount of time), etc.

Additionally, in one embodiment, a migration plan to migrate from the current state to the alternate state is obtained, e.g., provided or determined, STEP 704. This plan includes which virtual machines are to be migrated to which hosts and at what times. An example of this is depicted in FIGS. 5A-6C (e.g., Table 500, future network state 530, and/or current schedule 605).

Additionally, in accordance with one or more aspects, one or more future mappings are obtained and displayed via, for instance, the graphical user interface, STEP 706. These additional mappings may be for future points in time. For instance, if the current migration schedule is for VM1 to move from Host A to Host F in 1 hour, then an additional mapping may be for VM1 to move to Host E in 10 hours, etc., as shown in Table 500 (FIG. 5A). The processor may select the additional points in time, and/or a user may select via sliding a slide bar on the GUI.

A determination is made, based on for instance, the current mapping and one or more of the future mappings whether an alert condition, such as a cycle, a loop, a ping-pong condition, a user-defined condition, exists, STEP 708. Additionally, the current migration plan may be displayed, including, for instance, an indication that at least one alert condition exists, and/or an indication of one or more specific alert conditions, if any, STEP 709.

If an alert condition exists, then a determination is made as to whether the migration plan is to be adjusted, INQUIRY 710. If not, the current migration plan proceeds, STEP 712. Otherwise, the migration plan is adjusted, STEP 714. This adjustment may be performed automatically by the processor and/or controlled by the user in which the user indicates one or more adjustments to be made via, for instance, the graphical user interface. Processing then continues with STEP 704.

With the adjustment, the current schedule of migration may be altered to, for instance, not perform the migration for the immediate optimal mapping and wait for a later time; thereby, saving the cost of migration. Further, in one embodiment, calculations may also be performed to determine the savings of the optimal mapping at a current time, Time A, and the optimal future mapping at a future time, Time B. The migration may be scheduled if the migration meets a metric for the change in savings for delta(B-A). If the metric is met, the migration is performed. Other examples also exist.

Figure 7B:
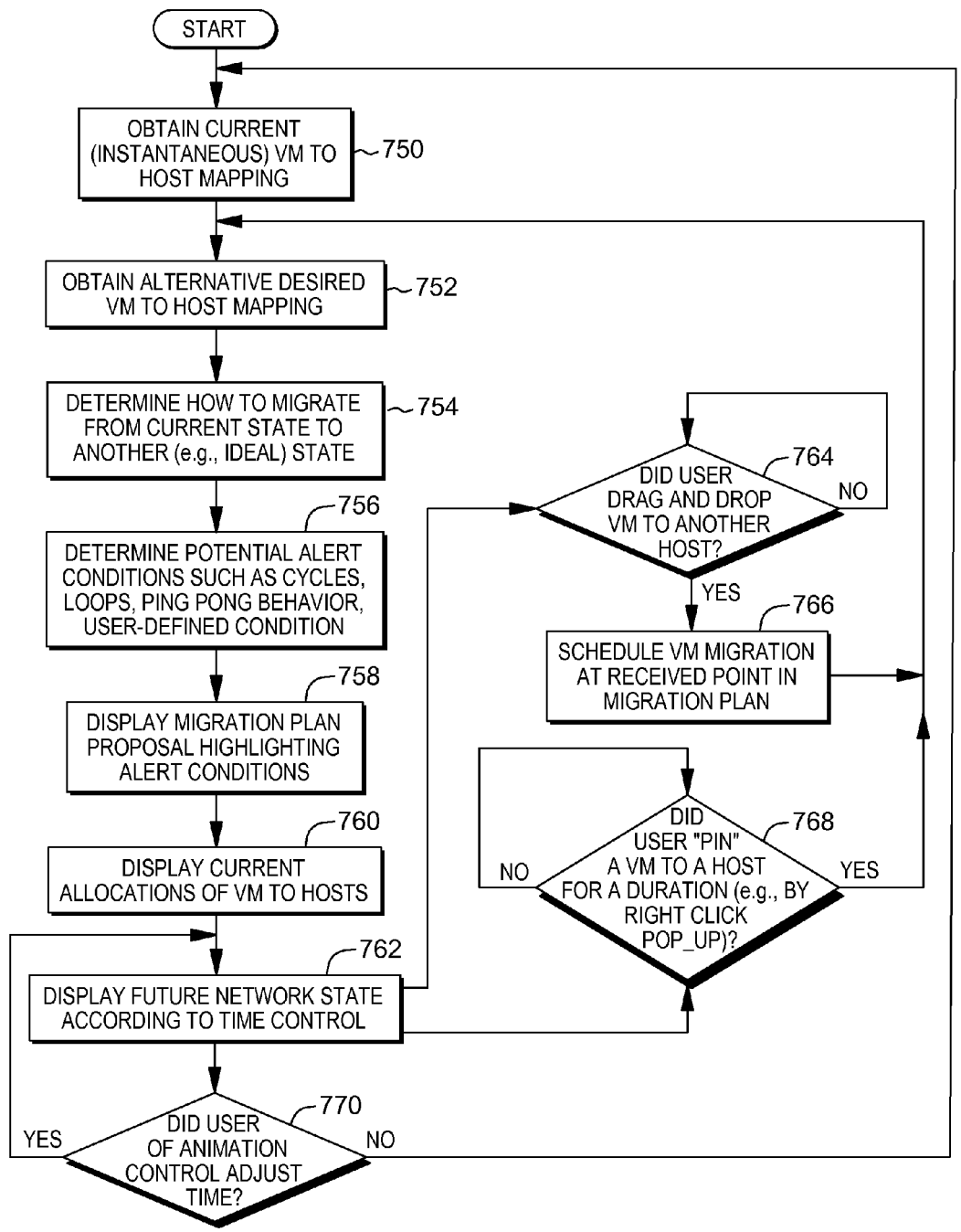
FIG. 7B depicts another embodiment of logic to determine a migration plan, and to display current and future mappings, as well as potential alert conditions, in accordance with one or more aspects.

Another embodiment of logic to facilitate migration of virtual machines using a graphical user interface is described with reference to FIG. 7B. Referring to FIG. 7B, initially, a processor of the computer system/server obtains a current (e.g., instantaneous) virtual machine to host mapping, an example of which is depicted in Table 500 and/or current network state 502, STEP 750. Additionally, the processor obtains (e.g., computes or is provided) at least one alternate virtual machine to host mapping, STEP 752. As examples, the alternate virtual machine to host mapping may be computed a number of ways, depending on, for instance, a strategy for the computing environment. For instance, if the strategy is load balancing, then a round-robin technique for load balancing may be used; and if the strategy is consolidation, e.g., of hosts and/or virtual machines, then a genetic or combinatorial bin packing algorithm for consolidation may be used. Other examples are also possible for the strategy and/or mapping technique. The input to the algorithms may include virtual machine and host capacitance (e.g., RAM, CPU, network bandwidth, I/O bandwidth); any type of constraints, such as co-location or anti-co-location; or time duration.

Thereafter, a determination is made as to how to migrate from a current state to another state, STEP 754. In one example, an A-star (A*) search is performed that walks through the environment in an autonomous manner attempting different mappings and finding a most direct or an acceptable approach, based on strategy, that works.

In one particular example, a VM migration plan can be created by processing a first mapping of VMs to hosts along with a second mapping of VMs to hosts. Pre-processing can be performed followed by machine search techniques with heuristics and pruning mechanisms to generate serialized optimal paths from the first state (i.e., an origin state) to a second state (i.e., a goal state). The serialized output can be further processed into a parallel plan that achieves faster convergence (i.e., time to achieve the goal state from the origin state) through live guest migration. The net result is that convergence time to an idealized virtual data center from an arbitrary virtualized data center is reduced drastically. In one embodiment, a variation of an A-star (A*) search algorithm can be employed to generate the VM migration plan.

In one specific embodiment of generating a migration plan, an initial mapping of a plurality of virtual machines to a plurality of hosts is determined as an origin state. The origin state may be the current state of mappings between VMs and hosts in the system. Then, a final mapping of the virtual machines to the hosts is determined as a goal state. Any known method of generating a goal state may be used to determine the goal state, such as load balancing, resource consolidation, and the like.

A plurality of candidate paths is generated to transition from the initial mapping to the final mapping. The candidate paths include possible intermediate states that sequentially lead between the origin state and goal state.

The candidate paths are evaluated based on a heuristic state transition cost to transition from state-to-state from the origin state through a plurality of intermediate states to the goal state by recursively obtaining a list of transitions that a parent state underwent to reach the parent state from the origin state. The heuristic state transition cost can be based on a fixed cost assigned to each one of a plurality of enumerated transition types. The enumerated transition types may include: a partial transition type that places at least one but not all of the virtual machines onto at least one of the hosts according the goal state; an endgame transition type that fully satisfies the goal state; a counter-movement transition type that takes away at least one of the virtual machines from a targeted host of the goal state; a cycle transition type that moves at least one of the virtual machines back onto a previous host; and a random transition type that shuffles locations of one or more of the virtual machines.

A heuristic goal cost to reach the goal state from the intermediate states is identified based on, for instance, a fewest number of virtual machine movements. In one embodiment, a mapping data structure is formed for each of the initial mapping and the final mapping, and the heuristic goal cost is computed based on assignment of a distance between the origin state and the goal state on a per host basis using the mapping data structures. Iterating over each of the hosts may be performed to compute a number of virtual machines present in one state but absent in another state moving from the origin state towards the goal state and from the goal state towards the origin state.

A virtual machine migration plan is generated based on the heuristic state transition cost of the candidate paths in combination with the heuristic goal cost of a sequence of transitions from the origin state to the goal state having a lowest total cost.

In addition to generating a migration plan, one or more potential alert conditions, if any, are determined, STEP 756. In this embodiment, this step is optional, since the output from the last step may not provide any potential alert conditions. The potential alert conditions may be, for instance, loops, cycles, ping-pong effects, or user-defined conditions, and may be based on, for instance, the current mapping and one or more alternate future mappings.

The migration plan determined in STEP 754 is then displayed, in one embodiment, via, for instance, a graphical user interface, STEP 758. This display includes, in one example, the alert conditions determined in STEP 756, if any. Additionally displayed are the current allocations of virtual machines to hosts, STEP 760, and a future network state according to a time control, STEP 762.

Based on the display of the various information, the user, in one embodiment, may take action. For instance, the user may decide to drag and drop a virtual machine from one host to another host, may decide to pin a virtual machine to a particular host, and/or may decide to adjust the time control for showing future mappings, as examples.

Thus, an inquiry is made as to whether the user performed a drag and drop of a virtual machine to another host, INQUIRY 764. If not, no action is taken for this inquiry; however, if the user did perform the drag and drop, then a migration is scheduled to move the virtual machine to the other host, STEP 766, and processing continues to STEP 752. Further, an inquiry is made as to whether the user pinned a virtual machine to a host for a particular amount of time using, for instance, a right click pop-up or by some other means of the graphical user interface, INQUIRY 768. If not, no action is taken for this inquiry; however, if the user did pin a virtual machine, then processing continues to STEP 752. Additionally, an inquiry is made as to whether the user adjusted the time control to see future mappings in future points of time indicated by the time control, INQUIRY 770. If not, processing continues to STEP 750; otherwise, processing continues to STEP 762.

Described herein is a technique for facilitating migration of virtual machines to hosts in which future mappings of virtual machines to hosts are considered in whether a particular migration plan should be performed. For instance, one or more future mappings are considered relative to the current mapping to determine whether a potentially undesirable condition (referred to herein as an alert condition), such as a cycle, a loop, a ping-pong event, or a selected user-defined condition, would occur if the migration plan is performed. If so, then the migration plan may be revised.

Future mappings may be seen graphically, including by sliding a scrollable time bar to different times and displaying the mappings. As the time bar moves forward the eventual optimal paths will be shown and cycles or repetitive patterns in migrations will be shown for a selection of virtual machines. The graphical user interface then allows a user to modify the future migration schedule to either include or exclude alert conditions. In a further aspect, the system may identify alert conditions and automatically add them or remove them from a migration schedule based on a configured metric.

A graphical user interface is used to manage present and future virtual machine migrations and load balancing. The graphical user interface is capable of showing future optimal mappings given a point in time. A slider in the graphical user interface is used to show optimal mappings for future points in time. Based on this information, the user can decide which migrations to allow and which ones to disallow. More specifically, the slider is used for medium/mid-range forecasting (e.g., time periods less than 24 hours) to show and let the user override migrations that are unnecessary, wasteful or can result in cyclical migrations.

One or more aspects allow users to easily make sense of automated virtual machine placement strategies visually. Visually, the user is able to see cycles or other degenerate placement position strategies more readily when graphically presented as an animation, rather than sifting through technical information.

Additionally, one or more aspects allow a user to view for all hosts, a selection of arbitrary hosts, or a single host of interest, the cumulative expected CPU, memory, network, and disk loads for that host selection. This has the benefit of demonstrating constraints. For example, one constraint might be too many CPU intensive virtual machines vying for limited hardware processor capabilities of the common underlying hardware. Figures and graphs to represent the load or compute requirements at that future time are based on individual projections of per-resource metrics projected into the future based on historical trends for that particular virtual machine. Thus, for each host, the resource demands are summed and presented graphically in terms of the capacity of the host supporting those virtual machines.

In one or more aspects, using the graphical tool to examine planned migration placements improves the quality of the plan while quantitatively informing the operator of the impacts on resource consumption, whether interested in consolidation or load balancing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, storage, central storage, main storage, memory and main memory are used interchangeably, unless otherwise noted, implicitly by usage or explicitly.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating migration of virtual machines within a computing environment, said computer program product comprising:
 a computer readable storage medium readable by a processing circuit and storing instructions for execution by the processing circuit for performing a method comprising:

obtaining, by a processor, a current virtual machine-to-host mapping identifying a plurality of virtual machines executing in a current state of the computing environment;

obtaining, by the processor, a plurality of future virtual machine-to-host mappings, each of the future virtual machine-to-host mappings identifying the virtual machines to be executed in a future state of the computing environment;

obtaining, by the processor, a current migration plan including scheduled migration destinations and scheduled migration times for a subset of the virtual machines, the current migration plan to improve processing within the computing environment;

determining, based on the current virtual machine-to-host mapping and one or more future virtual machine-to-host mappings of the plurality of future virtual machine-to-host mappings, whether one or more alert conditions exist in the current migration plan, wherein determining an alert condition of the one or more alert conditions comprises:

selecting a virtual machine (VM) from the subset of virtual machines; and identifying a ping-pong effect for the selected virtual machine, the ping-pong effect indicating that the virtual machine is scheduled to move from its current host of the computing environment to a future destination host, and then return back to the current host within a predefined amount of time;

displaying, on a graphical user interface, the current virtual machine-to-host mapping and at least multiple future virtual machine-to-host mappings of the plurality of future virtual machine-to-host mappings, wherein the displaying further comprises:

displaying the at least multiple future virtual machine-to-host mappings at different points of time in the future, in response to control action of a slider bar on the graphical user interface; and visually alerting a user about the identified ping-pong effect associated with the selected VM;

responsive to the determined alert condition and the identified ping-pong effect, adjusting the current migration plan by modifying a migration destination corresponding to the selected VM and delaying a scheduled migration time with an adjusted interval to address the alert condition; and migrating the plurality of virtual machines according to the adjusted current migration plan, the migration transitioning the computing environment from the current state to the future state.

2. The computer program product of claim 1, wherein the displaying includes providing an indication on the graphical user interface that one or more alert condition exist, based on determining the one or more alert conditions exist.

3. The computer program product of claim 2, wherein the displaying comprises displaying on the graphical user interface a table, the table including one or more future virtual machine-to-host mappings at a particular point in time, and specifying the one or more alert conditions.

4. The computer program product of claim 2, wherein the displaying comprises displaying a graphical representation on the graphical user interface, the graphical representation including at least a portion of the plurality of future virtual machine-to-host mappings, and indicating that one or more alert conditions exist.

5. The computer program product of claim 1, wherein the adjusting comprises:

determining, by the processor, that an adjustment is to be made to the current migration plan; and performing, by the processor, the adjustment to the current migration plan to provide a revised current migration plan.

6. The computer program product of claim 1, wherein the adjusting comprises:

obtaining, by the processor, an indication by a user that an adjustment is to be made to the current migration plan; and performing, by the processor, the adjustment to the current migration plan to provide a revised current migration plan.

7. The computer program product of claim 6, wherein the obtaining the indication comprises determining that the user performed an action on the graphical user interface to indicate that an adjustment is to be made.

8. The computer program product of claim 7, wherein the action comprises at least one of a drag and drop of a selected virtual machine on a chosen host, or a pin action to pin a virtual machine on a host.

9. The computer program product of claim 1, wherein the obtaining the plurality of future virtual machine-to-host mappings comprises:

determining a time interval in which the plurality of future virtual machine-to-host mappings are to be obtained; and obtaining the plurality of future virtual machine-to-host mappings based on the time interval.

10. The computer program product of claim 9, wherein the determining the time interval comprises one of: obtaining the time interval from a user via the graphical user interface or selecting, by the processor, the time interval.

11. The computer program product of claim 1, wherein the different points in time are selected by a user sliding the slider bar on the graphical user interface.

12. A computer system for facilitating migration of virtual machines within a computing environment, said computer system comprising:

a memory; and a processor in communications with the memory, wherein the computer system is configured to perform a method, said method comprising:

obtaining, by a processor, a current virtual machine-to-host mapping identifying a plurality of virtual machines executing in a current state of the computing environment;

obtaining, by the processor, a plurality of future virtual machine-to-host mappings, each of the future virtual machine-to-host mappings identifying the virtual machines to be executed in a future state of the computing environment;

obtaining, by the processor, a current migration plan including scheduled migration destinations and scheduled migration times for a subset of the virtual machines, the current migration plan to improve processing within the computing environment;

determining, based on the current virtual machine-to-host mapping and one or more future virtual machine-to-host mappings of the plurality of future virtual machine-to-host mappings, whether one or more alert conditions exist in the current migration plan, wherein determining an alert condition of the one or more alert conditions comprises:

selecting a virtual machine (VM) from the subset of virtual machines; and identifying a ping-pong effect for the selected virtual machine, the ping-pong effect indicating that the virtual machine is scheduled to move from its current host of the computing environment to a future destination host, and then return back to the current host within a predefined amount of time;

displaying, on a graphical user interface, the current virtual machine-to-host mapping and at least multiple future virtual machine-to-host mappings of the plurality of future virtual machine-to-host mappings, wherein the displaying further comprises:

displaying the at least multiple future virtual machine-to-host mappings at different points of time in the future, in response to control action of a slider bar on the graphical user interface; and visually alerting a user about the identified ping-pong effect associated with the selected VM;

responsive to the determined alert condition and the identified ping-pong effect, adjusting the current migration plan by modifying a migration destination corresponding to the selected VM and delaying a scheduled migration time with an adjusted interval to address the alert condition; and migrating the plurality of virtual machines according to the adjusted current migration plan, the migration transitioning the computing environment from the current state to the future state.

13. The computer system of claim 12, wherein the adjusting comprises:

determining, by the processor, that an adjustment is to be made to the current migration plan; and performing, by the processor, the adjustment to the current migration plan to provide a revised current migration plan.

14. The computer system of claim 12, wherein the adjusting comprises:

obtaining, by the processor, an indication by a user that an adjustment is to be made to the current migration plan; and performing, by the processor, the adjustment to the current migration plan to provide a revised current migration plan.

15. The computer system of claim 14, wherein the obtaining the indication comprises determining that the user performed an action on the graphical user interface to indicate that an adjustment is to be made.

16. The computer system of claim 12, wherein the obtaining the plurality of future virtual machine-to-host mappings comprises:

determining a time interval in which the plurality of future virtual machine-to-host mappings are to be obtained; and obtaining the plurality of future virtual machine-to-host mappings based on the time interval.

17. The computer system of claim 12, wherein the different points in time are selected by a user sliding the slider bar on the graphical user interface.

18. The computer system of claim 12, wherein the displaying includes providing an indication on the graphical user interface that one or more alert conditions exist, based on determining the one or more alert conditions exist.

19. The computer system of claim 18, wherein the displaying comprises displaying a graphical representation on the graphical user interface, the graphical representation including at least a portion of the plurality of future virtual machine-to-host mappings, and indicating that one or more alert conditions exist.

20. The computer system of claim 18, wherein the displaying comprises displaying on the graphical user interface a table, the table including one or more future virtual machine-to-host mappings at a particular point in time, and specifying the one or more alert conditions.

* * * * *